(12) United States Patent　　(10) Patent No.: US 11,364,973 B2
Nishiyabu　　(45) Date of Patent: Jun. 21, 2022

(54) HYBRID VEHICLE

(71) Applicant: KAWASAKI MOTORS, LTD., Akashi (JP)

(72) Inventor: Masaki Nishiyabu, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 333 days.

(21) Appl. No.: 16/788,503

(22) Filed: Feb. 12, 2020

(65) Prior Publication Data

US 2020/0317293 A1　　Oct. 8, 2020

(30) Foreign Application Priority Data

Apr. 2, 2019　(JP) ............................. JP2019-070504

(51) Int. Cl.
　　*B62M 23/02*　　(2010.01)
　　*B60K 6/36*　　(2007.10)
　　*B60K 6/383*　　(2007.10)
　　*B62M 11/02*　　(2006.01)

(52) U.S. Cl.
　　CPC ............... *B62M 23/02* (2013.01); *B60K 6/36* (2013.01); *B60K 6/383* (2013.01); *B62M 11/02* (2013.01)

(58) Field of Classification Search
　　CPC . B60K 6/36; B60K 6/383; B60K 6/40; B60K 6/547; B60K 6/387; B60K 6/405; B60K 6/48; B60K 2006/4825; B62M 23/02; B62M 11/02; B60W 2300/36; F16H 57/0439; Y02T 10/62
　　USPC ................................................ 180/65.1, 220
　　See application file for complete search history.

(56) References Cited

U.S. PATENT DOCUMENTS

2010/0243348 A1 * 9/2010 Nomura .............. F16H 57/0439
　　　　　　　　　　　　　　　　　　　　　　　180/65.21

FOREIGN PATENT DOCUMENTS

GB　　2588970 A　*　5/2021　............. B60K 17/02
JP　　5339606 B2　　11/2013

* cited by examiner

*Primary Examiner* — Minnah L Seoh
*Assistant Examiner* — Felicia L. Brittman
(74) *Attorney, Agent, or Firm* — Alleman Hall Creasman & Tuttle LLP

(57) ABSTRACT

A hybrid vehicle includes: an engine; an electric motor; a transmission; a main clutch; a primary gear configured to transmit rotational power from the engine to the main clutch; a pump including a driven shaft to which rotational power is input from the engine and the electric motor; a first one-way clutch configured to transmit power from the engine to the pump; and a second one-way clutch configured to transmit power from the electric motor to the pump. The first one-way clutch and the second one-way clutch are disposed around the input shaft and located between the primary gear and a gear train of the transmission.

8 Claims, 4 Drawing Sheets

HYBRID VEHICLE

CROSS-REFERENCE TO RELATED APPLICATION

This application claims priority to and the benefit of Japanese Patent Application No. 2019-070504, filed on Apr. 2, 2019, the entire disclosure of which is incorporated herein by reference.

BACKGROUND OF THE INVENTION

Field of the Invention

The present disclosure relates to a hybrid vehicle equipped with an engine and an electric motor.

Description of the Related Art

A hybrid vehicle is known which includes a first transmission route that transmits rotational power from an engine (internal combustion engine) to an oil pump through a first one-way clutch and a second transmission route that transmits rotational power from an electric motor to the oil pump through a second one-way clutch (see JP 5,339,606 B, for example). In this hybrid vehicle, the oil pump is mechanically driven even when either the engine or electric motor is stopped. As such, the hybrid vehicle need not be equipped with an auxiliary motor dedicated for driving of the pump.

However, in order to mechanically drive the oil pump using power from the engine and the electric motor, two one-way clutches are required to prevent interference between power from the engine and power from the electric motor. Thus, the space occupied by the power transmission routes for driving of the pump is larger than in engine vehicles.

SUMMARY OF THE INVENTION

A hybrid vehicle according to one aspect of the present disclosure includes: an engine; an electric motor; a transmission including an input shaft, an output shaft, and a gear train, the transmission being configured to change the speed of rotation produced by rotational power transmitted to the input shaft from the engine and the electric motor and output the resulting rotation to a drive wheel; a main clutch connected to one end of the input shaft of the transmission and disposed in a power transmission route between a crankshaft of the engine and the input shaft of the transmission; a primary gear disposed around the input shaft and located between the main clutch and the gear train in an axial direction of the input shaft to transmit rotational power from the engine to the main clutch; a pump including a driven shaft to which rotational power is input from the engine and the electric motor; a first one-way clutch configured to transmit power from the engine to the pump; and a second one-way clutch configured to transmit power from the electric motor to the pump, wherein the first one-way clutch and the second one-way clutch are disposed around the input shaft and located between the primary gear and the gear train.

With the above configuration, the first one-way clutch and the second one-way clutch are disposed in the gap between the primary gear and the gear train of the transmission, and the pump can be disposed close to the transmission. Thus, in the hybrid vehicle, the size of the power system including the pump can be reduced.

In an example, the hybrid vehicle may further include: a crankcase including a side wall portion located between the primary gear and the gear train, the crankcase accommodating the crankshaft, the input shaft, the output shaft, and the gear train; and a bearing fitted in a hole provided in the side wall portion, the bearing supporting the input shaft. The input shaft and the driven shaft of the pump may project from the side wall portion toward the primary gear, and the first one-way clutch and the second one-way clutch may be disposed between the primary gear and the bearing and connected to the driven shaft of the pump.

With the above configuration, the first one-way clutch and the second one-way clutch are disposed in the gap between the primary gear and the bearing provided in the side wall portion of the crankcase, and power can be transmitted over a short distance to that driven shaft of the pump which projects from the side wall portion of the crankcase toward the primary gear. Thus, an increase in the number of components for power transmission can be avoided, and at the same time the size of the power system including the pump can be reduced.

In an example, the primary gear may include a recessed portion recessed in a direction from the gear train to the main clutch, the first one-way clutch may be located closer to the primary gear than the second one-way clutch, at least a part of the first one-way clutch may be placed inside the recessed portion, and the first one-way clutch as viewed in a radial direction of the primary gear may overlap the primary gear.

With the above configuration, the location of the first one-way clutch in the axial direction overlaps the location of the primary gear in the axial direction. Thus, the size of the power system can be reduced in the axial direction.

In an example, the hybrid vehicle may further include an annular member disposed around the input shaft and connected to the driven shaft of the pump to enable power transmission to the driven shaft, and the first one-way clutch and the second one-way clutch may be adjacent to each other in the axial direction and fitted inside the annular member.

With the above configuration, the two one-way clutches are disposed adjacent to each other, and the two adjacent one-way clutches are fitted inside one annular member (e.g., a gear, sprocket, or pulley). Thus, an increase in the number of components can be avoided, and at the same time the size of the power system can be reduced in the axial direction.

In an example, at least a part of the annular member may be placed inside the recessed portion, and the annular member as viewed in a radial direction of the primary gear may overlap the primary gear.

With the above configuration, the location of the annular member in the axial direction overlaps the location of the primary gear in the axial direction, and thus the size of the power system can be reduced in the axial direction.

In an example, the hybrid vehicle may further include a collar including: a first tubular portion rotatably supporting an inner peripheral surface of the primary gear; and a second tubular portion located closer to the gear train than the first tubular portion, the second tubular portion projecting radially outward from the first tubular portion and being fitted inside the second one-way clutch, the collar being fitted around the input shaft to corotate with the input shaft. The primary gear may include a tubular portion fitted inside the first one-way clutch to enable power transmission to the first one-way clutch, and the tubular portion of the primary gear may be rotatably fitted around the first tubular portion of the collar.

With the above configuration, the power transmission routes leading to the one-way clutches can be made compact.

In an example, the input shaft may include an oil passage extending in the axial direction and an oil discharge hole extending radially outward from the oil passage and opening toward the collar, the first tubular portion of the collar may include an oil discharge hole communicating with the oil discharge hole of the input shaft and opening toward a slide space provided between the first tubular portion of the collar and the tubular portion of the primary gear, and an oil discharge passage extending radially outward from the slide space toward the first one-way clutch and the second one-way clutch may be formed between the second tubular portion of the collar and the tubular portion of the primary gear.

With the above configuration, a lubricant oil supplied to the slide space provided between the primary gear and the collar can be used also for lubrication of the two one-way clutches, and a simplified lubrication structure can be achieved.

In an example, the hybrid vehicle may be a straddle vehicle on which a rider is seated in a straddling position, and the crankshaft of the engine, the input shaft of the transmission, and the output shaft of the transmission may extend in a vehicle width direction of the straddle vehicle.

With the above configuration, the straddle vehicle (e.g., a motorcycle), whose size in the vehicle width direction needs to be small, can avoid a size increase in the vehicle width direction and be compact.

DETAILED DESCRIPTION OF THE EMBODIMENTS

Hereinafter, an embodiment will be described with reference to the drawings.

Figure 1:
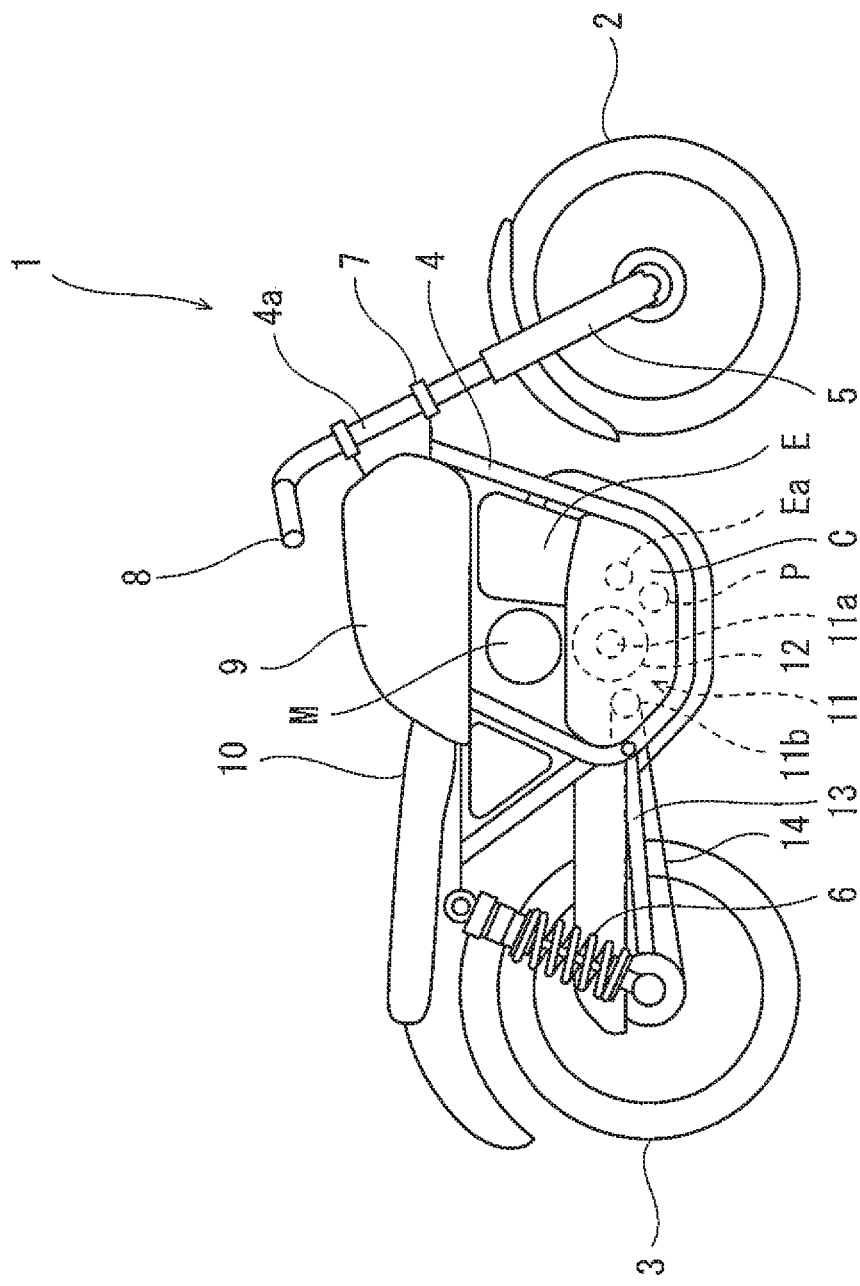
FIG. 1 is a side view of a motorcycle according to an embodiment.

FIG. 1 is a side view of a motorcycle 1 according to the embodiment. As shown in FIG. 1, the motorcycle 1 is an exemplary straddle vehicle on which the rider is seated in a straddling position. The motorcycle 1 is a hybrid vehicle. The motorcycle 1 includes a front wheel 2, a rear wheel 3 (drive wheel), a vehicle body frame 4, a front suspension 5 connecting the front wheel 2 to a front portion of the vehicle body frame 4, and a rear suspension 6 connecting the rear wheel 3 to a rear portion of the vehicle body frame 4. The front suspension 5 is coupled to a bracket 7. A steering shaft connected to the bracket 7 is supported by a head pipe 4a constituting a part of the vehicle body frame 4, and the steering shaft is angularly movable. A handle 8 to be healed by the hands of the rider is mounted on the steering shaft. A fuel tank 9 is disposed rearward of the handle 8, and a seat 10 on which the rider sits is disposed rearward of the fuel tank 9. An engine E serving as a power source for travel is mounted on the vehicle body frame 4 and located between the front and rear wheels 2 and 3. An electric motor M serving as a power source for travel is disposed in the vicinity of the engine E.

A transmission 11 is disposed rearward of the engine E. The transmission 11 includes an input shaft 11a and an output shaft 11b. On an end of the input shaft 11a there is mounted a main clutch 12 (e.g., a multi-plate clutch) that enables and disables power transmission from a crankshaft Ea to the input shaft 11a. Rotational power of the electric motor M is transmitted to the input shaft 11a of the transmission 11 via an unillustrated power transmission mechanism (e.g., a gear, chain, or belt). That is, both power of the engine E and power of the electric motor M are transmitted to the input shaft 11a.

An oil pump P is disposed in the vicinity of the input shaft 11a. The oil pump P is driven through mechanical association with rotation of the input shaft 11a. The oil pump P includes a driven shaft Pa (see FIG. 4) to which rotational power is input from the engine E and the electric motor M. The crankshaft Ea of the engine E, the input and output shafts 11a and 11b of the transmission 11, the main clutch 12, and the oil pump P are accommodated in a crankcase C. The crankshaft Ea, input shaft 11a, output shaft 11b, and driven shaft Pa are parallel to each other and extend in the vehicle width direction of the motorcycle 1 (leftward/rightward direction). A swing arm 13 supporting the rear wheel 3 and extending in the forward/rearward direction is supported by the vehicle body frame 4, and the swing arm 13 is angularly movable. Rotational power of the output shaft 11b of the transmission 11 is transmitted to the rear wheel 3 via an output transmission member 14 (e.g., a chain or belt).

Figure 2:
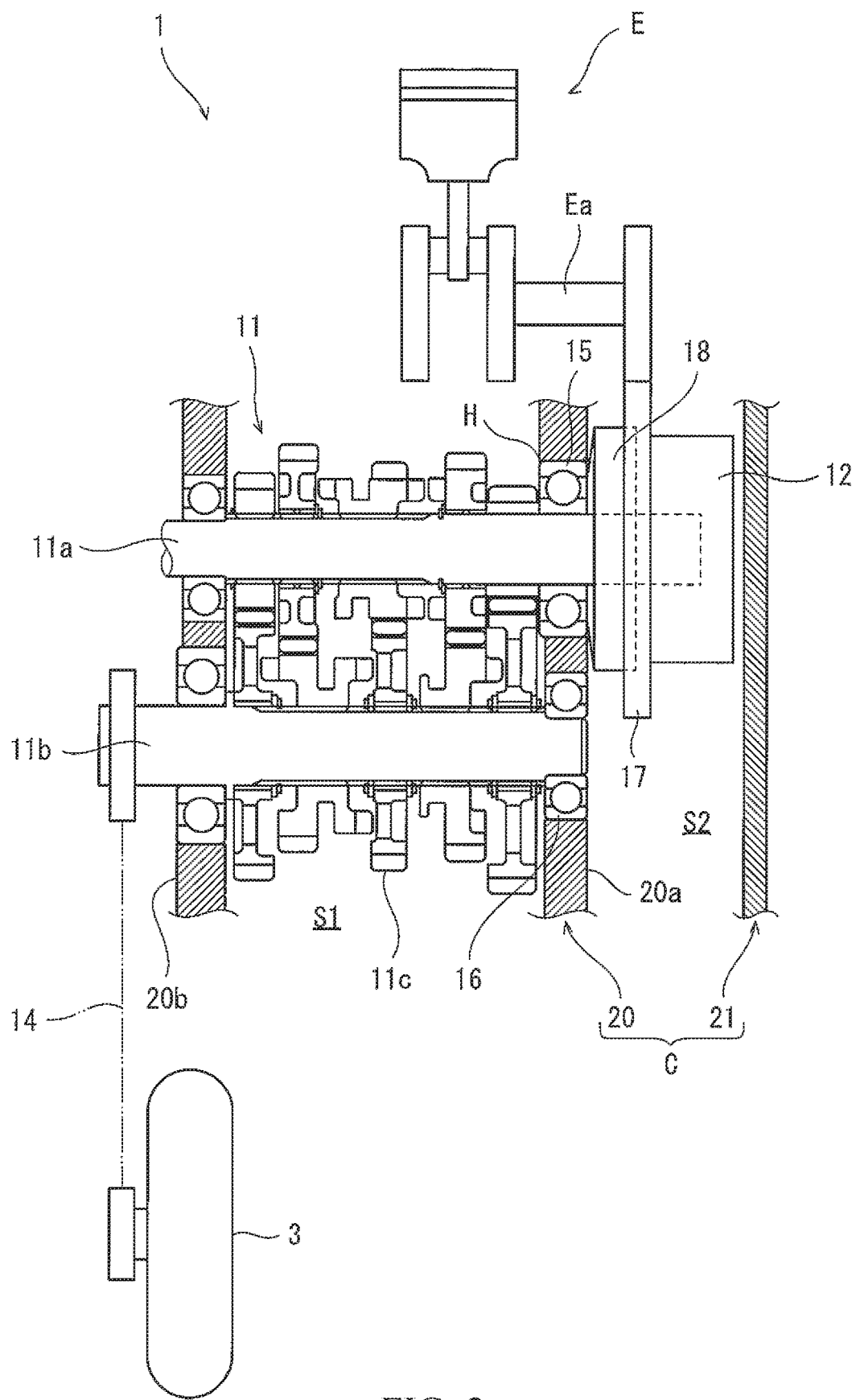
FIG. 2 is a schematic view of a power system of the motorcycle shown in FIG. 1.

FIG. 2 is a schematic view of the power system of the motorcycle 1 shown in FIG. 1. As shown in FIG. 2, the transmission 11 includes, in addition to the input shaft 11a and the output shaft 11b, a plurality of gear trains 11c having different reduction ratios. The transmission 11 is configured to transmit power from the input shaft 11a to the output shaft 11b through the gear trains 11c, and performs speed change with a selected one of the gear trains 11c. The transmission 11 is, for example, a dog clutch transmission. The input shaft 11a of the transmission 11 can receive rotational power transmitted from the crankshaft Ea of the engine E and rotational power transmitted from the electric motor M. Rotational power of the output shaft 11b of the transmission 11 is transmitted to the rear wheel 3 via the output transmission member 14. Thus, rotational power transmitted to the input shaft 11a from the engine E and electric motor M is subjected to speed change by one of the gear trains 11c, then transmitted to the output shaft 11b, and output to the rear wheel 3.

The main clutch 12 is mounted on one end of the input shaft 11a of the transmission 11. The main clutch 12 is disposed in the power transmission route between the crankshaft Ea of the engine E and the input shaft 11a of the transmission 11. A primary gear 17 is disposed around the input shaft 11a, and the primary gear 17 is located between the main clutch 12 and the gear trains 11c in the axial direction of the input shaft 11a. The primary gear 17 transmits rotational power from the crankshaft Ea to the main clutch 12. A power distributor 18 for transmitting power to the pump is disposed around the input shaft 11a, and the power distributor 18 is located between the primary gear 17 and the gear train 11c.

The crankcase C includes a case body 20 and a case cover 21. The case body 20 includes a pair of side wall portions 20a and 20b spaced from each other in the vehicle width direction, and a main accommodation space S1 is formed between the side wall portions 20a and 20b. The main accommodation space S1 of the case body 20 accommodates the crankshaft Ea, input shaft 11a, output shaft 11b, gear trains 11c, and oil pump P. Each of the side wall portions 20a and 20b is provided with a pair of holes H, and bearings 15 and 16 are fitted in the holes H. The bearing 15 rotatably supports the input shaft 11a, and the bearing 16 rotatably supports the output shaft 11b. The side wall portion 20a is located between the primary gear 17 and the gear trains 11c. The input shaft 11a projects from the side wall portion 20a toward the primary gear 17. Although not illustrated in FIG. 2, the driven shaft Pa (see FIG. 4) of the oil pump P also projects from the side wall portion 20a toward the primary gear 17.

The power distributor 18 is located between the primary gear 17 and the bearing 15 which is provided in the side wall portion 20a and which supports the input shaft 11a. The power distributor 18 is connected to the driven shaft Pa (see FIG. 4) of the oil pump P to enable power transmission to the driven shaft Pa. The power distributor 18 is configured to distribute power transmitted from the crankshaft Ea of the engine E via the primary gear 17 and power transmitted from the electric motor M via the input shaft 11a to the driven shaft Pa of the oil pump P in a suitable manner.

The case cover 21 is mounted laterally of the side wall portion 20a of the case body 20 of the crankcase C. An auxiliary accommodation space S2 is formed between the side wall portion 20a and the case cover 21. The auxiliary accommodation space S2 accommodates the main clutch 12, the primary gear 17, the power distributor 18, and the driven shaft Pa of the oil pump P.

Figure 3:
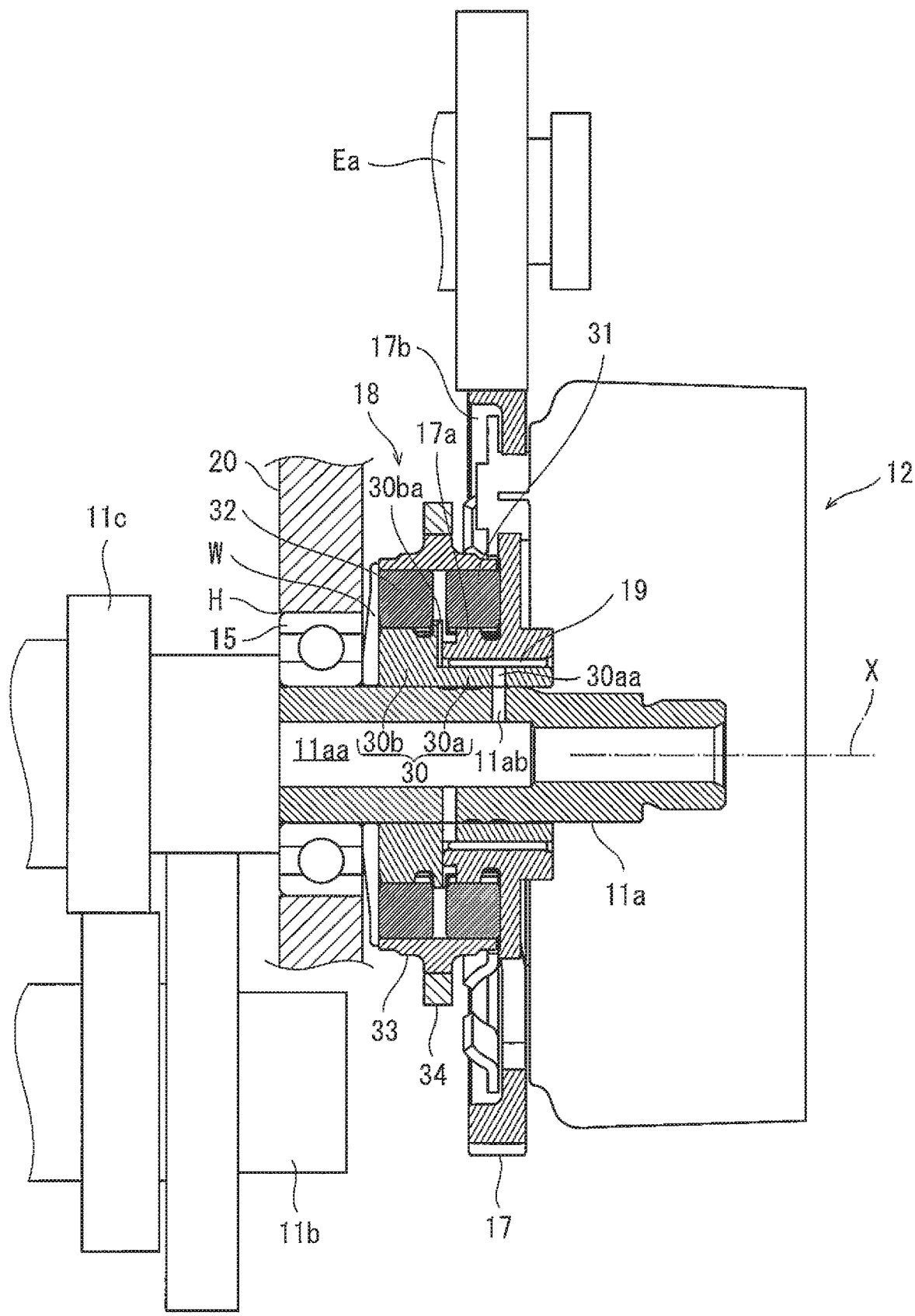
FIG. 3 is an enlarged cross-sectional view of key components shown in FIG. 2.
Figure 4:
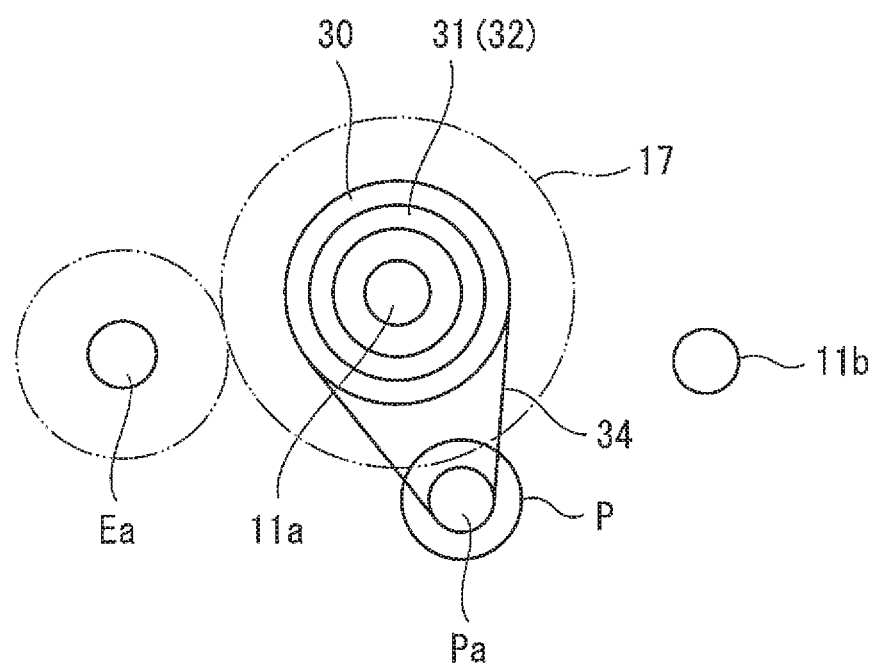
FIG. 4 is a schematic view of shafts and other components of the power system of the motorcycle of FIG. 1, as seen in the vehicle width direction.

FIG. 3 is an enlarged cross-sectional view of key components shown in FIG. 2. FIG. 4 is a schematic view of the shafts and other components of the power system of the motorcycle 1 of FIG. 1, as seen in the vehicle width direction. As shown in FIG. 3, the main clutch 12 includes an outer case (not illustrated), an inner case (not illustrated), and a multi-plate unit (not illustrated). Once the multi-plate unit is brought into a pressed state, the inner case becomes unable to rotate relative to the outer case, thus establishing a clutch-engaged state. Once the multi-plate unit is brought into a non-pressed state, the inner case becomes able to rotate relative to the outer case, thus establishing a clutch-disengaged state. The outer case of the main clutch 12 is coupled to the primary gear 17 so as to corotate with the primary gear 17. The inner case of the main clutch 12 is coupled to the input shaft 11a so as to corotate with the input shaft 11a. The inner diameter of the primary gear 17 is larger than the outer diameter of the input shaft 11a, and the inner peripheral surface of the primary gear 17 is spaced radially outward from the outer peripheral surface of the input shaft 11a.

The power distributor 18 includes a collar 30, a first one-way clutch 31, a second one-way clutch 32, and an annular member 33. The primary gear 17 includes a tubular portion 17a projecting from the inner periphery of the gear toward the power distributor 18. The collar 30 is fitted around the input shaft 11a and coupled to the input shaft 11a so as to corotate with the input shaft 11a. The collar 30 includes a first tubular portion 30a rotatably supporting the inner peripheral surface of the primary gear 17 and a second tubular portion 30b located closer to the gear trains 11c than the first tubular portion 30a and projecting radially outward from the first tubular portion 30a.

The tubular portion 17a of the primary gear 17 is rotatably fitted around the first tubular portion 30a of the collar 30. A slide space is provided between the tubular portion 17a of the primary gear 17 and the first tubular portion 30a of the collar 30, and a metal bearing 19 is disposed in this slide space. The second tubular portion 30b of the collar 30 faces the tubular portion 17a of the primary gear 17 in the direction of the axis X of the input shaft 11a. The outer diameter of the tubular portion 17a of the primary gear 17 is equal to the outer diameter of the second tubular portion 30b of the collar 30.

The first one-way clutch 31 is fitted around the tubular portion 17a of the primary gear 17, and the second one-way clutch 32 is fitted around the second tubular portion 30b of the collar 30. That is, the first one-way clutch 31 and the second one-way clutch 32 are disposed adjacent to each other in the direction of the axis X of the input shaft 11a, and the first one-way clutch 31 is located closer to the primary gear 17 than the second one-way clutch 32. Rotational power of the primary gear 17 is transmitted to the first one-way clutch 31, and rotational power of the input shaft 11a is transmitted to the second one-way clutch 32 via the collar 30.

The first one-way clutch 31 and the second one-way clutch 32 are fitted inside the annular member 33. The annular member 33 is, for example, a gear, sprocket, or pulley. The first one-way clutch 31 transmits power in a direction from the primary gear 17 to the annular member 33, and does not transmit power in a direction from the annular member 33 to the primary gear 17. The second one-way clutch 32 transmits power in a direction from the second tubular portion 30b of the collar 30 to the annular member 33, and does not transmit power in a direction from the annular member 33 to the second tubular portion 30b of the collar 30. Since the two one-way clutches 31 and 32 are adjacent to each other and fitted inside one annular member 33, an increase in the number of components can be avoided, and at the same time the size of the power system can be reduced in the direction of the axis X. The annular member 33 is connected to the driven shaft Pa of the oil pump P via a power transmission mechanism 34 (e.g., a gear, chain, or belt) so as to enable power transmission to the driven shaft Pa (see FIG. 4).

The primary gear 17 includes a recessed portion 17b recessed in a direction from the gear trains 11c to the main clutch 12. The recessed portion 17b is disposed adjacent to and radially outward of the tubular portion 17a. A part of the first one-way clutch 31 and a part of the annular member 33 are placed inside the recessed portion 17b. In other words, the first one-way clutch 31 and the annular member 33, as viewed in the radial direction of the primary gear 17, overlap the primary gear 17. Since the locations of the first one-way clutch 31 and annular member 33 in the direction of the axis X overlap the location of the primary gear 17 in the direction of the axis X, the size of the power system can be reduced in the direction of the axis X. If possible, the second one-way clutch 32 may be disposed such that the second one-way clutch 32 as viewed in the radial direction of the primary gear 17 overlaps the primary gear 17.

The input shaft 11a is provided with an oil passage 11aa extending along the axis X and an oil discharge hole 11ab extending radially outward from the oil passage 11aa and opening toward the collar 30 (or the first tubular portion 30a of the collar 30). The first tubular portion 30a of the collar 30 is provided with an oil discharge hole 30aa communicating with the oil discharge hole 11ab of the input shaft 11a. The oil discharge hole 30aa opens toward the bearing 19 (e.g., a metal bearing) disposed in the slide space provided between the first tubular portion 30a of the collar 30 and the tubular portion 17a of the primary gear 17.

The second tubular portion 30b of the collar 30 has a side surface facing the tubular portion 17a, and this side surface is provided with an oil discharge passage 30ba extending radially outward. The oil discharge passage 30ba is, for example, a groove extending in a radial fashion. While the collar 30 is corotating with the input shaft 11a, the oil discharge passage 30ba allows a lubricant oil present in the space holding the metal bearing 19 to be delivered under centrifugal force to the space holding the first one-way clutch 31 and the second one-way clutch 32. Thus, the lubricant oil supplied to the slide space provided between the primary gear 17 and the collar 30 can be used also for lubrication of the two one-way clutches 31 and 32, and a simplified lubrication structure can be achieved. A washer W is inserted between the power distributor 18 and the bearing 15.

With the configuration described above, the first one-way clutch 31 and the second one-way clutch 32 are disposed in the gap between the primary gear 17 and the gear trains 11c of the transmission 11 (in particular, between the bearing 15 and the primary gear 17 in the auxiliary accommodation space S2), and the oil pump P is disposed close to the transmission 11, so that power can be transmitted over a short distance to that driven shaft Pa of the oil pump P which projects from the side wall portion 20a of the crankcase C toward the primary gear 17. Thus, in the hybrid vehicle, an increase in the number of components for power transmission can be avoided, and at the same time the size of the power system including the oil pump P can be reduced. In particular, the motorcycle 1, whose size in the vehicle width direction needs to be small, can avoid a size increase in the vehicle width direction and be compact.

What is claimed is:

1. A hybrid vehicle comprising:
   an engine;
   an electric motor;
   a transmission comprising an input shaft, an output shaft, and a gear train, the transmission being configured to change the speed of rotation produced by rotational power transmitted to the input shaft from the engine and the electric motor and output the resulting rotation to a drive wheel;
   a main clutch connected to one end of the input shaft of the transmission and disposed in a power transmission route between a crankshaft of the engine and the input shaft of the transmission;
   a primary gear disposed around the input shaft and located between the main clutch and the gear train in an axial direction of the input shaft to transmit rotational power from the engine to the main clutch;
   a pump comprising a driven shaft to which rotational power is input from the engine and the electric motor;
   a first one-way clutch configured to transmit power from the engine to the pump; and
   a second one-way clutch configured to transmit power from the electric motor to the pump, wherein
   the first one-way clutch and the second one-way clutch are disposed around the input shaft and located between the primary gear and the gear train.

2. The hybrid vehicle according to claim 1, further comprising:
   a crankcase comprising a side wall portion located between the primary gear and the gear train, the crankcase accommodating the crankshaft, the input shaft, the output shaft, and the gear train; and
   a bearing fitted in a hole provided in the side wall portion, the bearing supporting the input shaft, wherein
   the input shaft and the driven shaft of the pump project from the side wall portion toward the primary gear, and
   the first one-way clutch and the second one-way clutch are disposed between the primary gear and the bearing and connected to the driven shaft of the pump.

3. The hybrid vehicle according to claim 1, wherein
   the primary gear comprises a recessed portion recessed in a direction from the gear train to the main clutch,
   the first one-way clutch is located closer to the primary gear than the second one-way clutch,
   at least a part of the first one-way clutch is placed inside the recessed portion, and
   the first one-way clutch as viewed in a radial direction of the primary gear overlaps the primary gear.

4. The hybrid vehicle according to claim 1, further comprising an annular member disposed around the input shaft and connected to the driven shaft of the pump to enable power transmission to the driven shaft, wherein
   the first one-way clutch and the second one-way clutch are adjacent to each other in the axial direction and fitted inside the annular member.

5. The hybrid vehicle according to claim 4, wherein
   the primary gear comprises a recessed portion recessed in a direction from the gear train to the main clutch,
   at least a part of the annular member is placed inside the recessed portion, and
   the annular member as viewed in a radial direction of the primary gear overlaps the primary gear.

6. The hybrid vehicle according to claim 1, further comprising a collar comprising: a first tubular portion rotatably supporting an inner peripheral surface of the primary gear; and a second tubular portion located closer to the gear train than the first tubular portion, the second tubular portion projecting radially outward from the first tubular portion and being fitted inside the second one-way clutch, the collar being fitted around the input shaft to corotate with the input shaft, wherein
   the primary gear comprises a tubular portion fitted inside the first one-way clutch to enable power transmission to the first one-way clutch, and
   the tubular portion of the primary gear is rotatably fitted around the first tubular portion of the collar.

7. The hybrid vehicle according to claim 6, wherein
   the input shaft comprises an oil passage extending in the axial direction and an oil discharge hole extending radially outward from the oil passage and opening toward the collar,
   the first tubular portion of the collar comprises an oil discharge hole communicating with the oil discharge hole of the input shaft and opening toward a slide space provided between the first tubular portion of the collar and the tubular portion of the primary gear, and
   an oil discharge passage extending radially outward from the slide space toward the first one-way clutch and the second one-way clutch is formed between the second tubular portion of the collar and the tubular portion of the primary gear.

8. The hybrid vehicle according to claim 1, wherein
   the hybrid vehicle is a straddle vehicle on which a rider is seated in a straddling position, and
   the crankshaft of the engine, the input shaft of the transmission, and the output shaft of the transmission extend in a vehicle width direction of the straddle vehicle.

* * * * *